(12) United States Patent
Shelor et al.

(10) Patent No.: US 6,626,162 B2
(45) Date of Patent: Sep. 30, 2003

(54) DIESEL FUEL RECYCLING SYSTEM AND APPARATUS TO REDUCE VAPOR EMISSIONS OF DIESEL FUEL

(75) Inventors: Frederick M. Shelor, Grasonville, MD (US); Ronald J. Bell, Reno, NV (US)

(73) Assignee: Clean Fuels, Inc., Reno, NV (US)

( * ) Notice: Subject to any disclaimer, the term of this patent is extended or adjusted under 35 U.S.C. 154(b) by 0 days.

(21) Appl. No.: 10/114,426

(22) Filed: Apr. 2, 2002

(65) Prior Publication Data

US 2003/0005913 A1 Jan. 9, 2003

Related U.S. Application Data

(60) Provisional application No. 60/282,343, filed on Apr. 5, 2001.

(51) Int. Cl.$^7$ ............................................. F02M 31/20
(52) U.S. Cl. ....................................... 123/541; 123/557
(58) Field of Search .................................. 123/541, 514

(56) References Cited

U.S. PATENT DOCUMENTS

| | | | |
|---|---|---|---|
| 4,872,438 A | * 10/1989 | Ausiello et al. | 123/541 |
| 5,551,404 A | * 9/1996 | Bauerle et al. | 123/541 |
| 5,765,537 A | 6/1998 | Coleman et al. | 123/514 |
| 5,794,598 A | * 8/1998 | Janik et al. | 123/514 |
| 5,832,903 A | * 11/1998 | White et al. | 123/514 |
| 6,234,151 B1 | * 5/2001 | Eck | 123/541 |
| 6,457,460 B1 | * 10/2002 | Doane et al. | 123/541 |

OTHER PUBLICATIONS

P. Machiele, "Methanol Fuel safety: A comparative Study of M100, M85, Gasoline, and Diesel Fuel as Motor Vehicle Fuels", Draft of *EPA–AA–SDSB–90–01 Technical Report*, pp. Cover Page, Table of Contents, 10, 19–2, 28, Nov. 1990.

* cited by examiner

Primary Examiner—Marguerite McMahon
(74) Attorney, Agent, or Firm—Sierra Patent Group, Ltd.

(57) ABSTRACT

A method and apparatus for the operation of a fuel flow system, including a recycling path and a cooler, comprising: sensing the temperature of the fuel; and inserting the cooler in the recycling path when the temperature of the fuel exceeds a threshold temperature. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR. 1.72(b).

15 Claims, 9 Drawing Sheets

DIESEL FUEL RECYCLING SYSTEM AND APPARATUS TO REDUCE VAPOR EMISSIONS OF DIESEL FUEL

PRIORITY CLAIM

This application claims the benefit of U.S. Provisional Application Serial No. 60/282,343, filed Apr. 5, 2001.

FIELD OF THE DISCLOSED SYSTEM

The present disclosed system relates to a re-circulating fuel system for diesel power plants and, in particular, for a closed diesel fuel system.

BACKGROUND OF THE DISCLOSED SYSTEM

There are various types of fuel delivery systems for many types of diesel power plants. Often, such systems rely on a fuel injection system, rather than a carburetor system, to mix the fuel with air and meter the resultant fuel-air mixture into the diesel power plant. Fuel injection systems often require a continuously circulating supply of fuel, unlike the carburetor system. Continuously circulating fuel systems often route any unused fuel from power plant to the fuel tank, this process is known as constant re-circulation.

Constant re-circulation has been seen as an "Achilles Heel" of diesel power plants. This is because the power plant often use fuel injector systems that are mounted on the power plant, thus the heat emitted by the power plant may cause the fuel injector system to capture some of the heat in the system. Consequently, the fuel recycling through the fuel injector system can be come quite hot. This heated fuel, upon its return to the fuel tank, transfers the power plant generated heat to the fuel in the fuel tank. The elevation of the temperature of the fuel in the fuel tank during operation is problematic for a variety of reasons and is known to cause disruption in the delivery of fuel in the diesel fuel delivery system.

Accordingly, there have been many attempts to lower the temperature of the returning fuel to avoid overheating the fuel in the fuel tank. These attempts include utilizing a acompartmentalized fuel tank, utilizing a return device in the fuel tank that slowly releases heated fuel into the main compartment of the tank, utilizing a heat exchanger/fuel cooler that that transfers the heat from returning fuel returning to another system that dispenses the heat to the outside environment.

Due to the recent environmental concerns, and a corresponding increase in environmental regulations of diesel fuel systems, there is also an issue regarding the reduction of fuel vapor emissions. In particular, the heated return fuel raises the temperature of the fuel in the fuel tank to the fuel's evaporative temperature, thereby increasing the amount of vapor emissions emitted by the fuel. This vapor emission may be allowed to escape to the outside atmosphere, which may be considered harmful to the environment. Thus, there is a need for reducing the fuel vapor emissions of diesel-powered vehicles.

Correspondingly, there is therefore a need for fuel cooling means especially with fuel re-circulation systems for diesel fuels and diesel fuel derivatives such as: water/diesel fuel injection; water in diesel fuel emulsions; and diesel and natural gas mixtures. This need requires a solution that can prevent the heating of diesel fuel in fuel tanks. One advantageous aspect of the solution may be that it can be done with as little change as possible to the existing fuel delivery system and as simply as possible to prevent such a complex system that may interfere with the proper operation of the fuel delivery system. Another advantageous aspect of the solution is that it may be accomplished with a low cost of manufacture, installation and maintenance.

SUMMARY OF THE DISCLOSED SYSTEM

The presently disclosed method and apparatus relate to the operation of a fuel flow system, including a recycling path and a cooler, comprising: sensing the temperature of the fuel; and inserting the cooler in the recycling path when the temperature of the fuel exceeds a threshold temperature.

DETAILED DESCRIPTION OF THE DISCLOSED SYSTEM

Those of ordinary skill in the art will realize that the following description of the disclosed system is illustrative only and not in any way limiting. Other embodiments of the disclosed system will readily suggest themselves to such skilled persons.

Figure 1A:
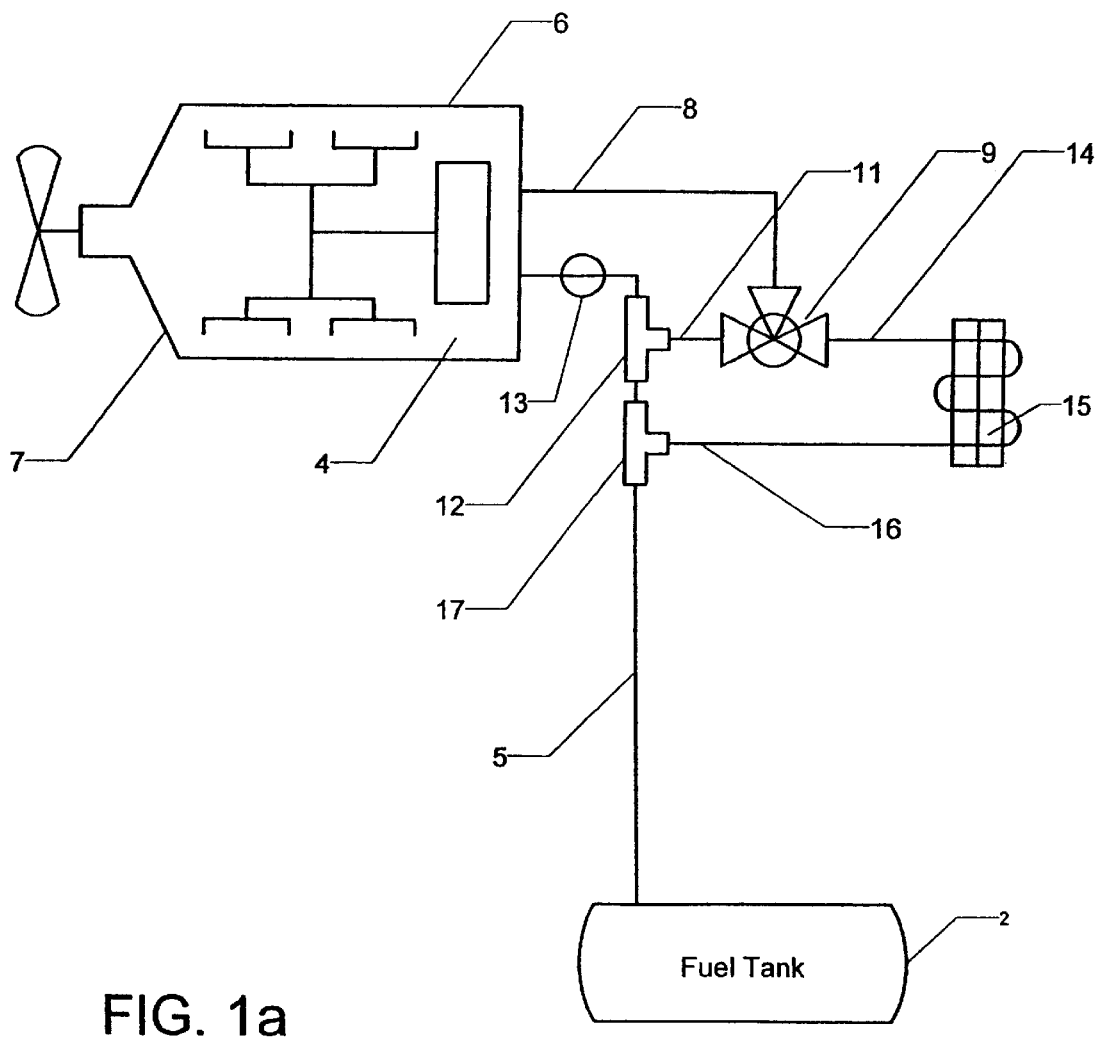
FIG. 1a is a schematic drawing of a preferred embodiment of the invention.

Depicted in FIG. 1a, is one embodiment of the disclosed diesel fuel recycling system and apparatus to reduce vapor emissions of diesel fuel and is generally denoted by the numeral 1. The system comprises a fuel tank 2, usually remotely located from the diesel power plant, which may be a diesel internal combustion engine 4. The fuel tank 2 has a fuel feed line 5 connecting it to a fuel pump 6 which may be located on or in near proximity to the diesel internal combustion engine 4. The fuel pump 6 draws fuel from the fuel tank 2 via the fuel feed line 5 and pumps the fuel into the fuel injector system 7 which may be mounted onto the diesel internal combustion engine 4. The fuel pump 6 continuously pumps fuel into the fuel injector system 7 regardless of the fuel injector system's demand for fuel. The excess fuel supplied to the fuel injector system 7 is drawn away from the fuel injector system 7 by the fuel return feed line 8.

Figure 1B:
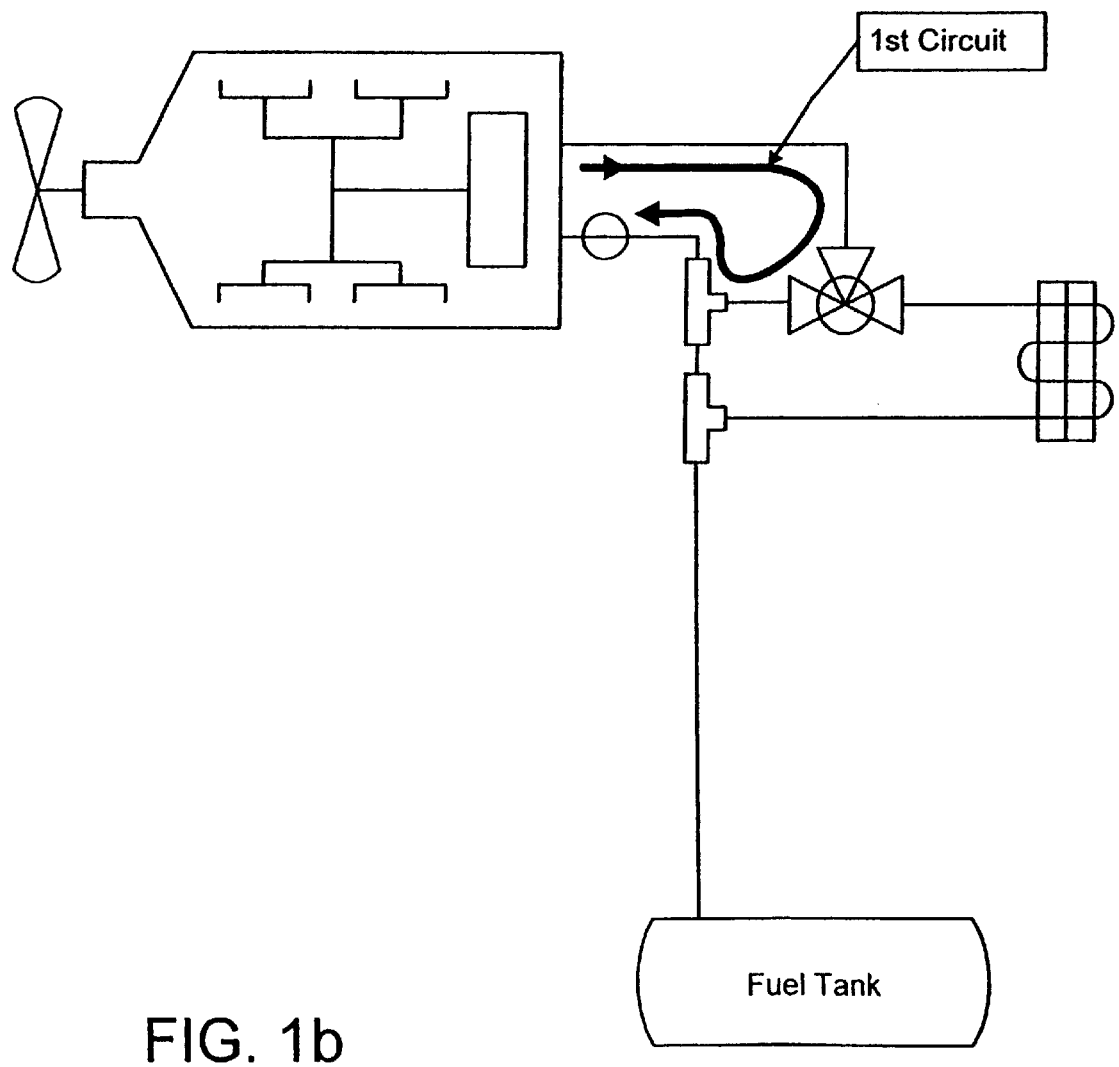
FIG. 1b is a schematic drawing illustrating a first fluid circuit.

The return fuel line 8 is coupled to a two-way valve 9 which splits the fuel system into two circuits. In the first circuit, individually emphasized in FIG. 1b but still referring to FIG. 1a, the two-way valve 9 is opened to shunt the return fuel via the first circuit fuel return feed line 11 into a first T-connector 12 that is located on the fuel feed line 5 upstream from the fuel pump 6 and downstream from the fuel tank 2. A thermostatic controller 13, located on the fuel feed line 5 between the fuel pump 6 and this first T-connector 12, controls the operation of the two-way valve 9. When the thermostatic controller 13 senses that the temperature of the fuel in the fuel feed line 5 is equal to or less than a threshold temperature in the region of about between 90° F. and 97° F., and more particularly about 95° F., the thermostatic controller 13 causes the two-way valve 9 to open the first circuit to re-circulate the return fuel back into the fuel feed line 5 and the fuel injector system 7. The temperatures disclosed in these embodiments may be changed to accommodate different fuel systems and conditions.

Figure 1C:
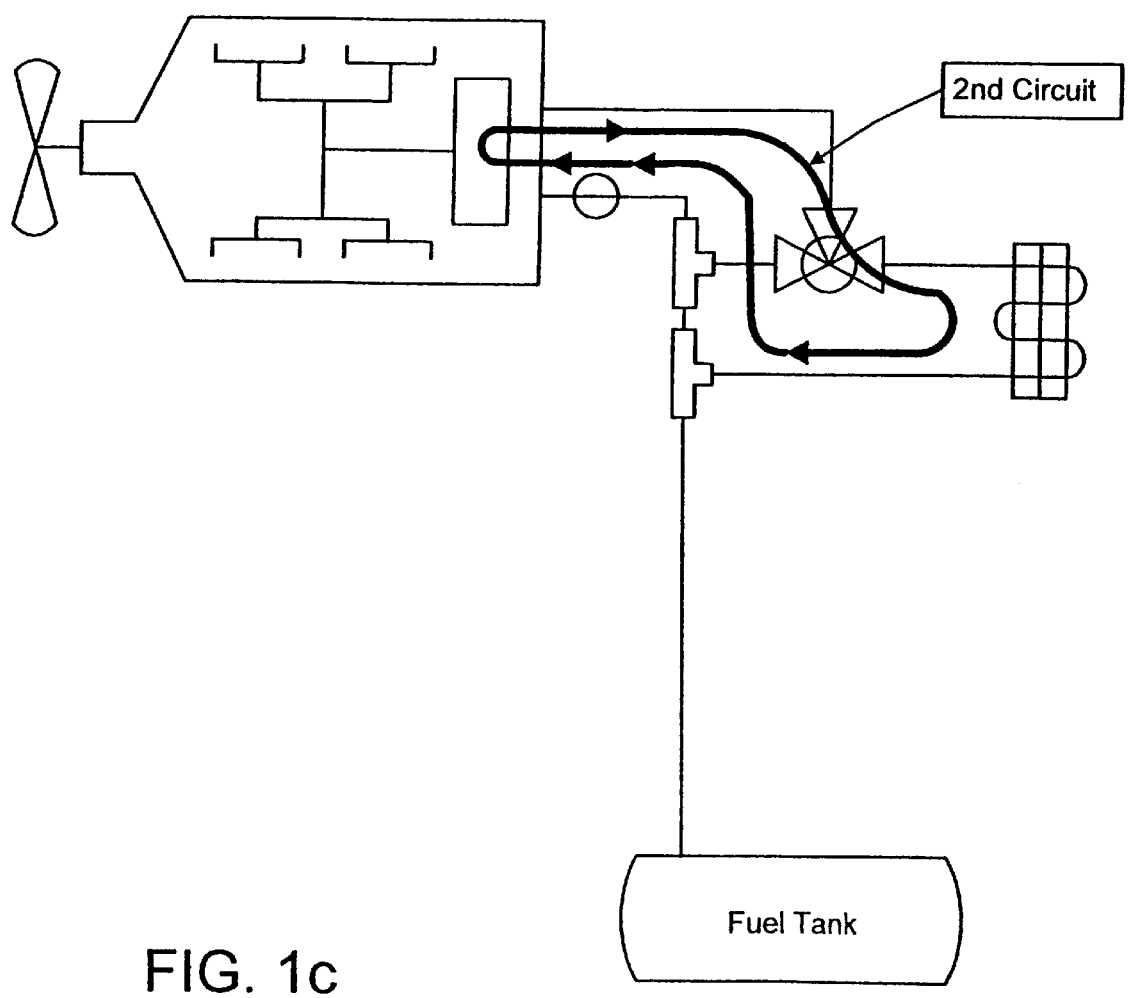
FIG. 1c is a schematic drawing illustrating a second fluid circuit.

When the thermostatic controller 13 senses that the temperature of the fuel in the fuel feed line 5 (i.e., the mixture of fuel from the fuel tank 2 and re-circulated return fuel) has reached a temperature above the threshold temperature, it causes the two way-valve 9 to close the direct re-circulating first circuit and open up the cooling second circuit. The second circuit is individually emphasized in FIG. 1c.

The second circuit transports the returning fuel when it passes through two-way valve 9 to a second circuit delivery feed line 14 into a fuel cooler 15. The fuel cooler 15 or heat exchanger could be of several different types from a fuel to air heat exchanger, to a cooler that is connected to air-conditioning system of the vehicle. After the fuel cooler 15 removes the excess heat, the cooled fuel is delivered by the second circuit through a second circuit return fuel feed line 16 to a second T-connector 17 located on the fuel feed line 5 upstream of the first T-connector 12 and downstream of the fuel tank 2.

Figure 2:
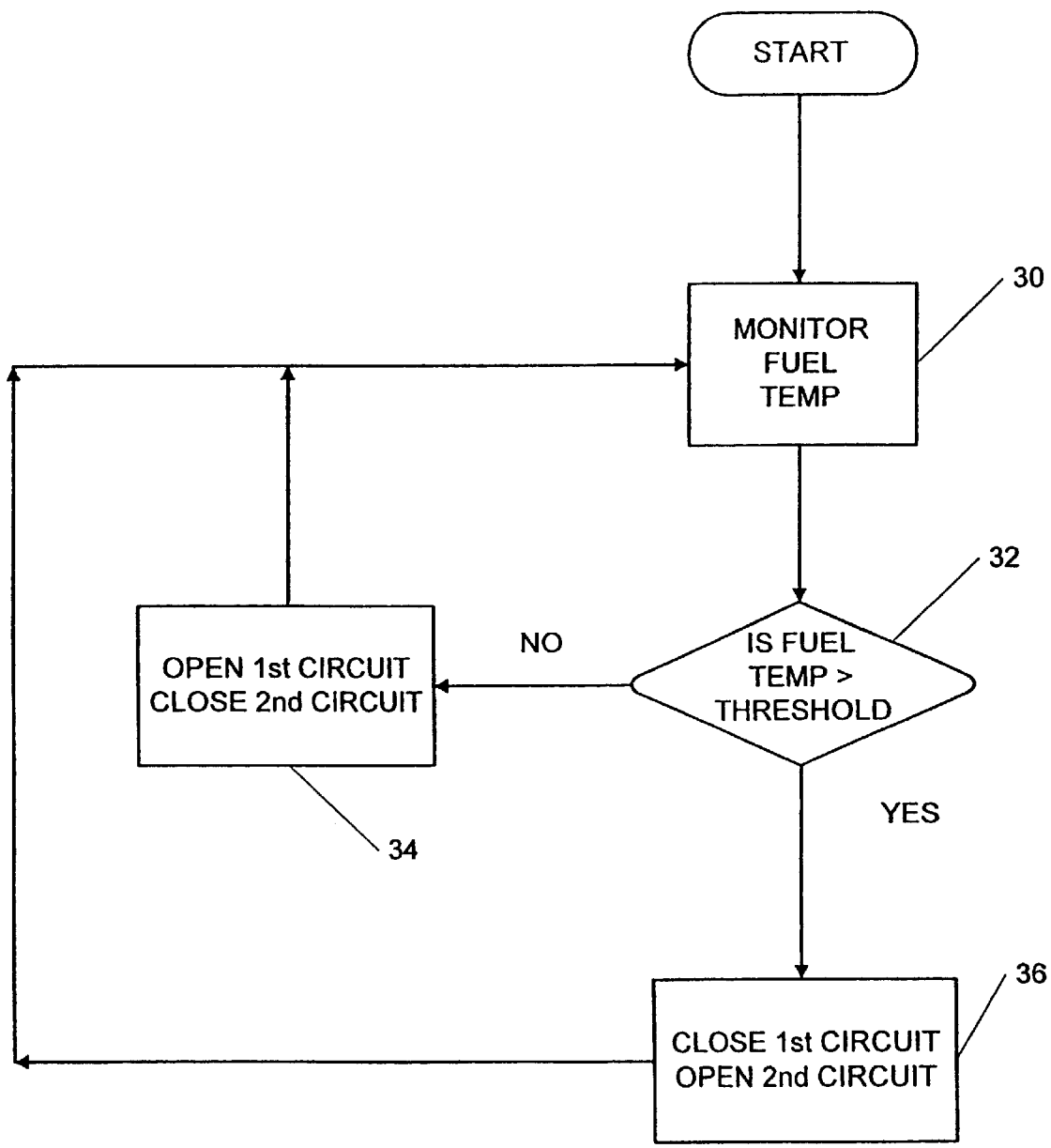
FIG. 2 is a flowchart illustrating one embodiment of a disclosed method.

A disclosed method of reducing the diesel fuel temperature is illustrated in FIG. 2. At act 30, the method monitors the fuel temperature. This monitoring may be continuous, or intermittent. This may be done at the thermostatic controller 13 in FIG. 1a. At query 32 the method determines whether the fuel temperature is greater than the threshold temperature. If the fuel temperature is greater than the threshold temperature, the method closes the first circuit and opens the second circuit at act 36. If the first circuit and second circuits are already in this state, the method merely maintains this state. If the fuel temperature is below or equal to the threshold temperature, the method opens the first circuit and closes the second circuit. If the first circuit and second circuits are already in this state, the method merely maintains this state.

Depicted in FIG. 2a, is another embodiment of the disclosed diesel fuel recycling system and apparatus to reduce vapor emissions of diesel fuel and is generally denoted by the numeral 20. The system comprises a fuel tank 21, usually remotely located from the diesel power plant 22, which may be a diesel internal combustion engine 23. The fuel tank 21 has a fuel feed line 24 connecting it to a fuel pump 25 which may be located on or in near proximity to the diesel internal combustion engine 23. The fuel pump 25 draws fuel from the fuel tank 21 via the fuel feed line 24 and pumps the fuel into the fuel injector system 26 which may be mounted onto the diesel internal combustion engine 23. The fuel pump 25 continuously pumps fuel into the fuel injector system 26 regardless of the fuel injector system's demand for fuel. The excess fuel supplied to the fuel injector system 26 is drawn away from the fuel injector system 26 by the fuel return feed line 27. The return fuel line 27 is coupled to a three-way valve 28, which is discussed in more detail below. A first thermostatic controller 31, located on the fuel feed line 24 between the fuel pump 25 and this first T-connector 30, and in part controls the operation of the three-way valve 28.

The first circuit in this embodiment is individually emphasized in FIG. 2b. Referring back to FIG. 2a, the first circuit comprises the fuel injection system 26, the fuel pump 25, the return fuel line 27, the three-way valve 28, the first T-connector 30 and first thermostatic controller 31.

The second circuit in this embodiment is individually emphasized in FIG. 2c. Referring back to FIG. 2a, the second circuit comprises the fuel injection system 26, the fuel pump 25, the return fuel line 27, the three-way valve 28, the fuel cooler 33, the T-connector 35, the fuel feed line 24, the T-connector 30 and first thermostatic controller 31.

Still referring to FIG. 2a, a third circuit returns return fuel back to the fuel tank 21 via fuel tank return feed 36. The third circuit is individually emphasized in FIG. 2d. This third circuit also features a second thermostatic controller 37 located on the fuel feed line 24 near the fuel tank 21. This second thermostatic controller 37 is coupled to the three-way valve 28 as is the first thermostatic controller 31.

When both thermostatic controllers 31 and 37 sense the temperature of the fuel at the beginning of the fuel feed line and the end of feed line as being equal to or below a first threshold temperature in the region of about between 20° F. to 50° F., and more particularly about 40° F., the three-way valve 28 is activated to return to fuel back to the fuel tank 21 through the third circuit while keeping the first and second circuits inoperative. When the first thermostatic controller 31 senses that the fuel at the end of the fuel feed line 24 has reached a temperature range above the first threshold temperature to a second threshold temperature in the region of about between 90° F. and 97° F., and more particularly about b 95°l F., the first thermostatic controller 31 overrides, if necessary, the second thermostatic controller 37 to activate the three-way valve 28 to open the first circuit, directly recycling the return fuel to the fuel injector system via the first T-connector 30, and to close the third and second circuits. When the first thermostatic controller 31 senses that the fuel at the end of the fuel feed line 24 has risen to a temperature equal to or above the second threshold temperature, it overrides the second thermostatic controller 37, and it activates the three-way valve 28 again, this time to open the fuel cooling second circuit and to close the first circuit and keep closed the third circuit.

If the second thermostatic controller 37 senses a temperature below the first threshold value, the thermostatic controller 37 may override the first thermostatic controller 31, and close the first and second circuits, and open the second circuit, thereby preventing the fuel tank fuel from getting too cold, which may cause some problems such as gelling of the fuel.

Figure 3A:
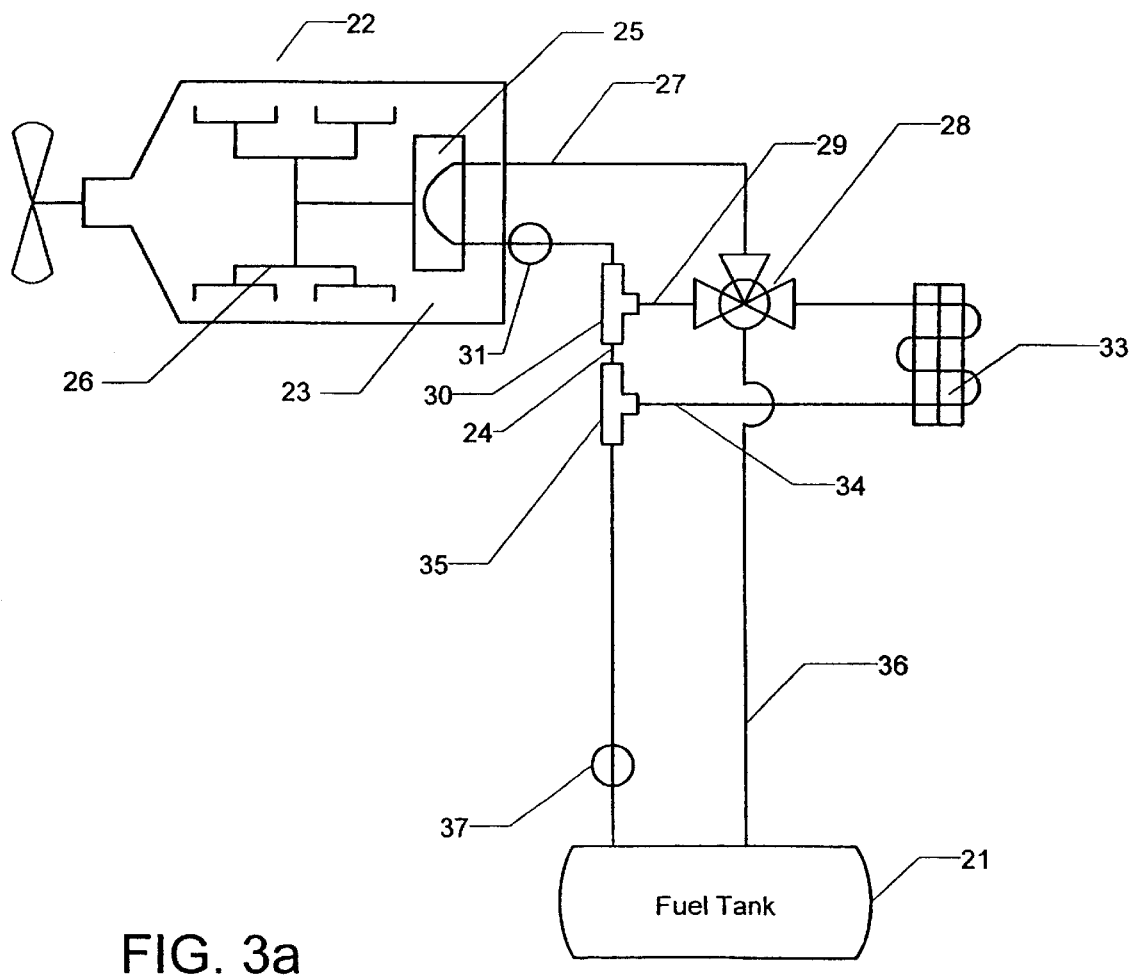
FIG. 3a is a schematic drawing of another embodiment of the invention.
Figure 3B:
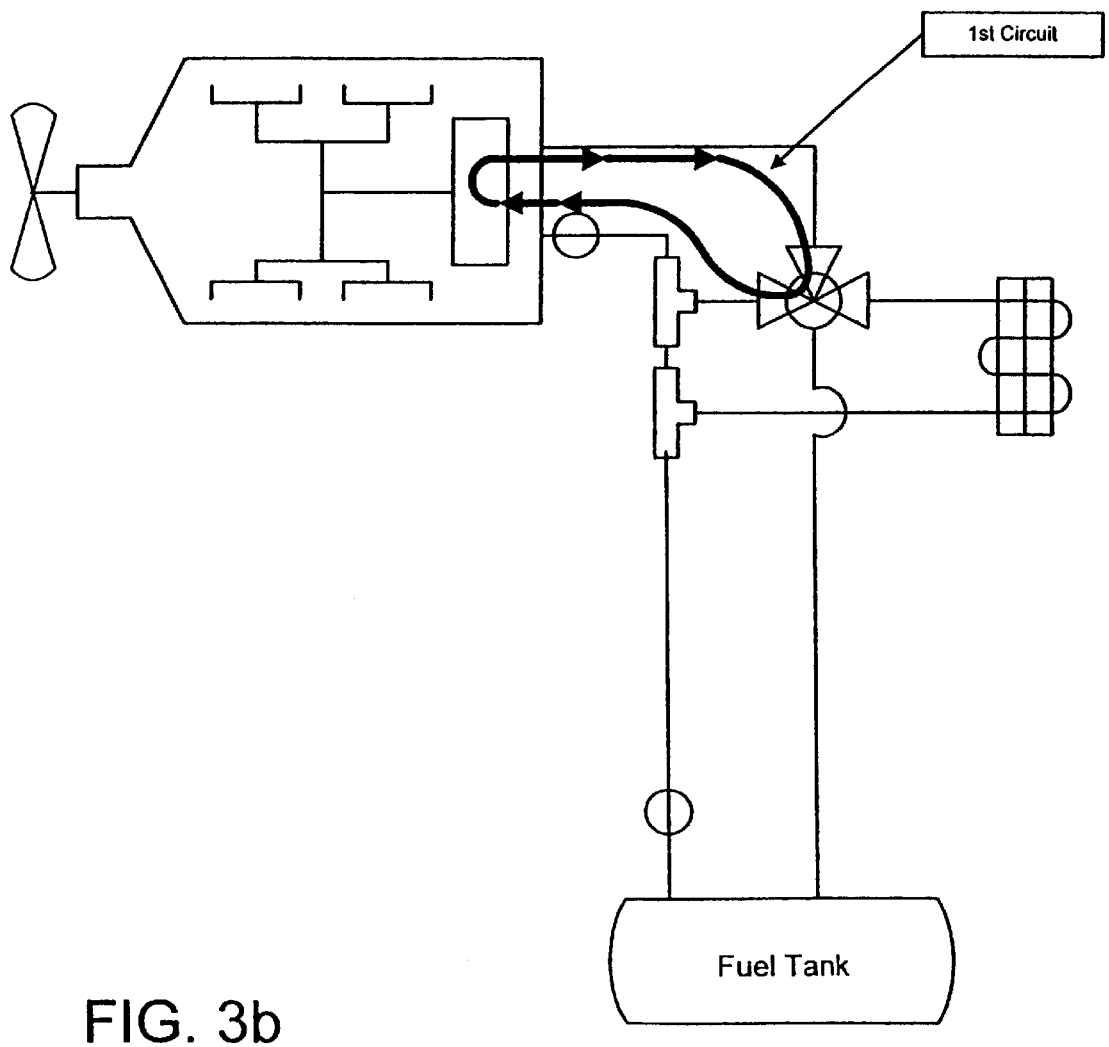
FIG. 3b is a schematic drawing illustrating a first fluid circuit.
Figure 3C:
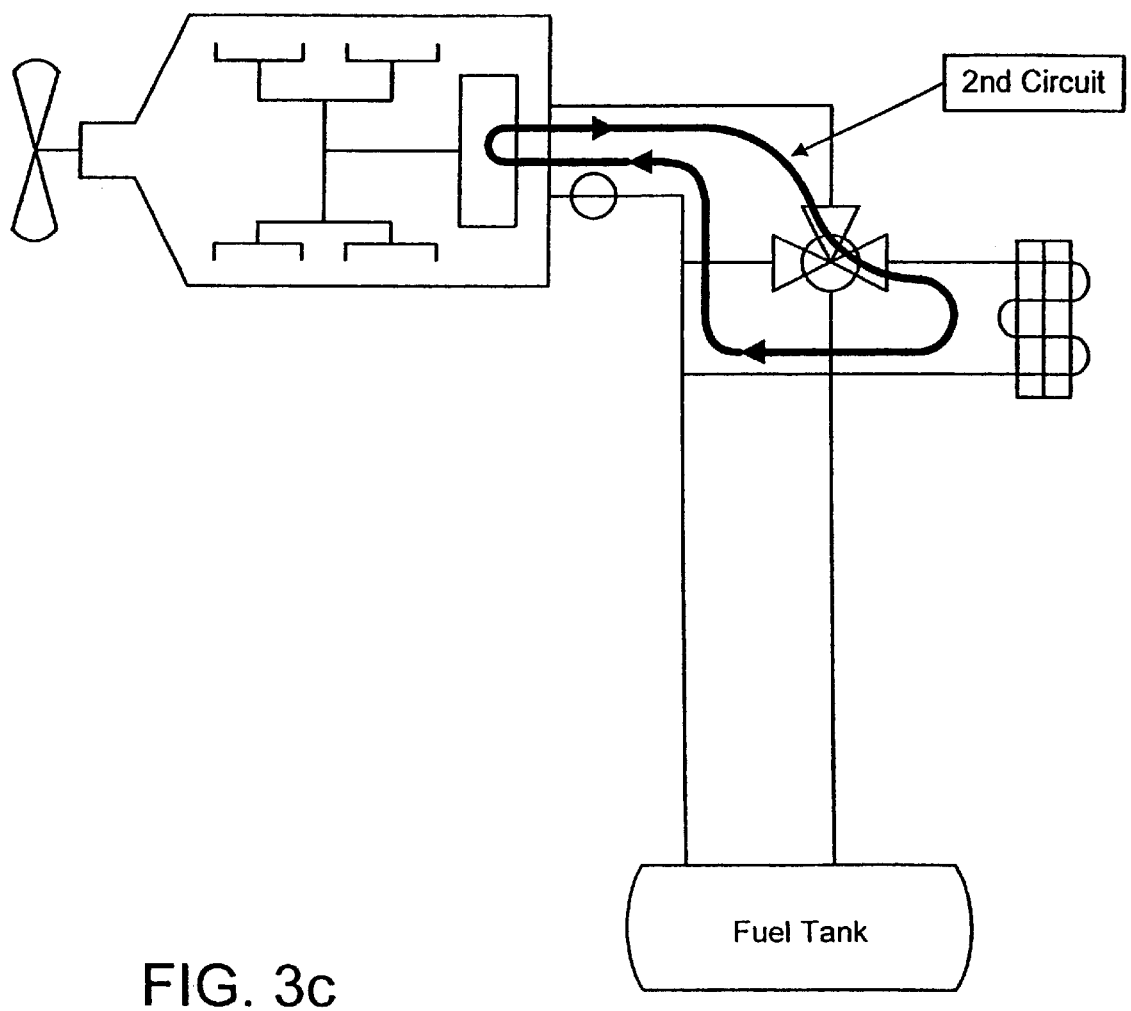
FIG. 3c is a schematic drawing illustrating a second fluid circuit.
Figure 3D:
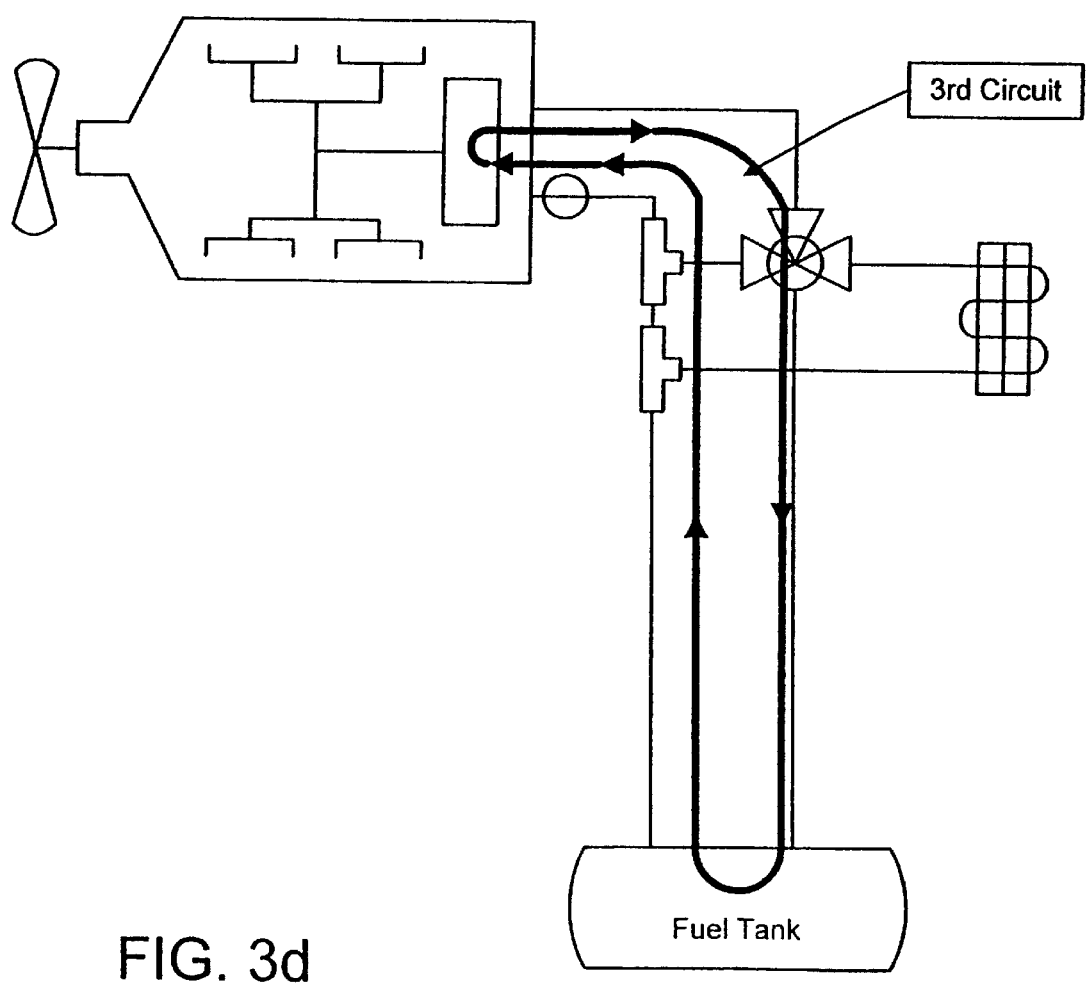
FIG. 3d is a schematic drawing illustrating a third fluid circuit.

In this manner, the disclosed system of FIG. 3a prevents hot fuel, (fuel of a mean temperature above the first threshold temperature) from reaching the fuel tank 21 and warming the fuel in the fuel tank 21. This prevents the fuel in the fuel tank 21 from being be artificial warmed so as to prematurely give-off vapor emissions into the environment. The invention could accommodate fuel systems using diesel fuel derivative such as diesel and water combinations or water-in-diesel fuel emulsions.

In operation, assuming an ambient temperature of below the first threshold temperature and a cold diesel internal combustion engine 4 at the same temperature, the thermostatic controllers 31 and 37 would set the three-way valve 28 so that only the third circuit would be opened and would direct the returning fuel back to the fuel tank 21. At the first threshold temperature, the diesel fuel gives off little or no vapor emissions because that temperature is well below the fuel's evaporative temperature. When the fuel being delivered to the diesel internal combustion engine 23 reaches a temperature above the first threshold temperature, the first thermostatic controller 31 activates the three-way valve, so that the third circuit is closed and the first circuit is opened, while keeping the second circuit closed. The first circuit is opened causing the return fuel to be re-circulated directly into the fuel feed line 24. As the engine continues to warm and the temperature of the return fuel/tank fuel correspondingly rises. When this fuel reaches the second threshold temperature or above, the first thermostatic controller 31 activates the three-way valve 28 to close the direct first circuit and open the cooling second circuit, sending the return fuel to the fuel cooler 33 before returning it to the fuel feed line 24. The third circuit at this time remains closed. Should the fuel cooler 33 cool the return fuel to a temperature below the second threshold temperature, the cooling second circuit will be closed while the direct first circuit reopens. In one embodiment, the third circuit will be activated usually only upon the stopping and starting of the diesel internal combustion engine 23, provided that the diesel internal combustion engine 23 has stopped long enough for it and the fuel to have cooled to a temperature below the first threshold temperature.

Figure 4:
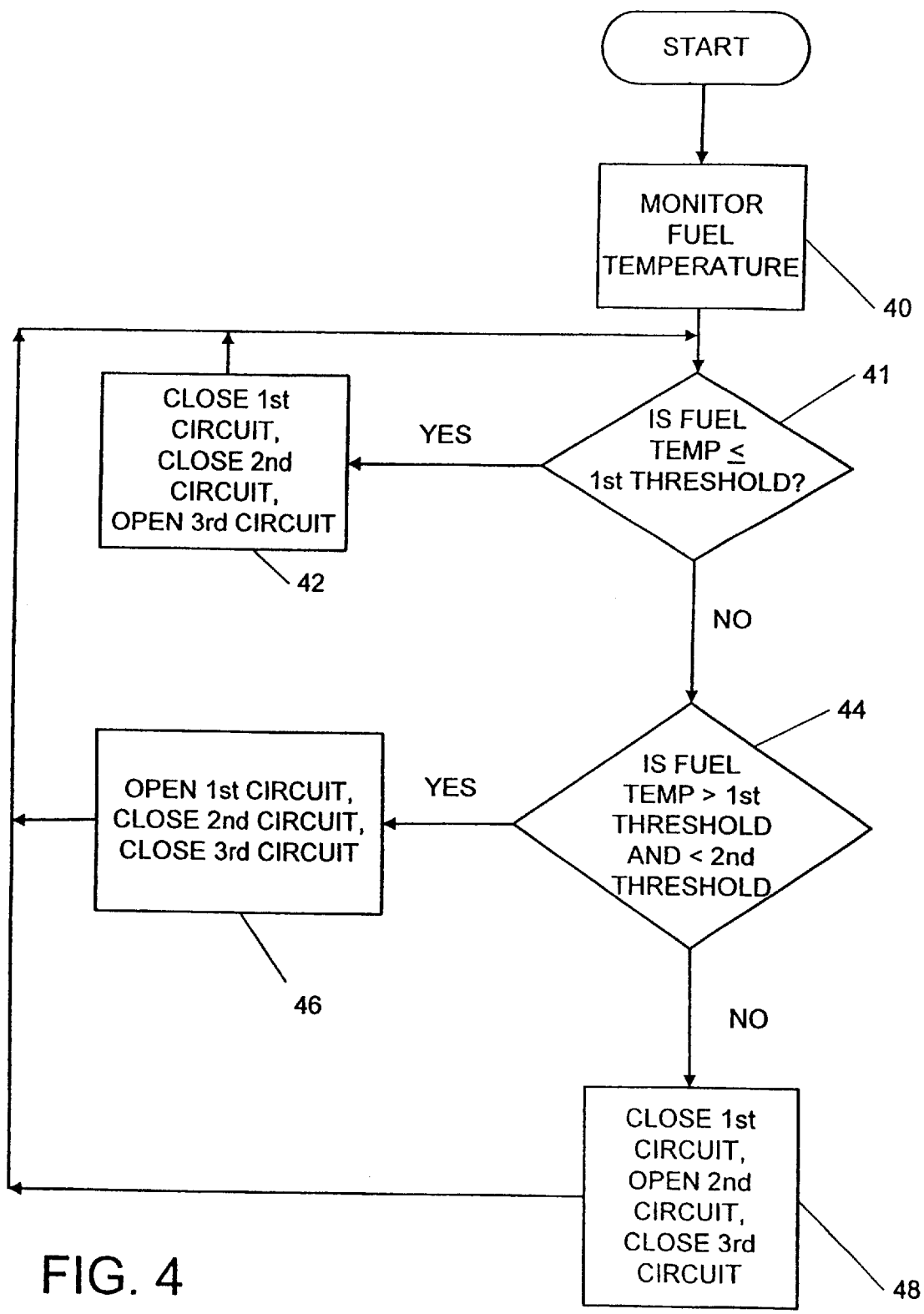
FIG. 4 is a flowchart illustrating one embodiment of a disclosed method.

A disclosed method of maintaining a lower diesel fuel temperature associated with the embodiment shown in FIGS. 3a–d is illustrated in FIG. 4. At act 40, the method monitors the fuel temperature. This monitoring may be continuous, or intermittent. This may be done at the thermostatic controllers 31 and 37 from FIG. 3a. At query 41 the method determines whether the fuel temperature is below or equal to the first threshold temperature. If the fuel temperature is below or equal to the first threshold temperature, the method closes the first circuit, closes the second circuit and opens the third circuit at act 42. If the first, second, and third circuits are already in this state, the method merely maintains this state. If the fuel temperature is above the first threshold temperature, the method determines at query 44 whether the fuel temperature is above the first threshold temperature and below the second threshold temperature. If the fuel temperature is above the first threshold temperature and below the second threshold temperature, the method opens the first circuit, closes the second circuit, and closes the third circuit. If the three circuits are already in this state, the method merely maintains this state. If at query 44, the method determines that the fuel temperature is not above the first threshold temperature and below the second threshold temperature, then at act 48, the method closes the first circuit, opens the second circuit, and closes the third circuit. If the three circuits are already in this state, the method merely maintains this state.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A fuel recycling system comprising:
    a fuel pump;
    a first circuit for recycling fuel to said fuel pump;
    a cooler;
    a second circuit for recycling fuel to said fuel pump through said cooler;
    a thermostat; and
    a valve in flow communication with said fuel pump and controlled by said thermostat to direct fuel flow through said first circuit when said fuel is at a temperature below a threshold temperature and to direct fuel flow through said second circuit when said fuel is at a temperature above said threshold temperature.

2. The system of claim 1, wherein said threshold temperature is selected from the range of temperatures from about 90° F. to about 97° F.

3. The system of claim 1, wherein said threshold temperature is about 95° F.

4. A method for controlling the flow of fuel in a fuel system; including a fuel pump, a cooler and a fuel tank; comprising:
    recycling flow through said fuel pump and fuel tank if the fuel temperature is below a first threshold temperature;
    recycling flow through said fuel pump if the fuel temperature is above a first threshold temperature and below a second threshold temperature; and
    recycling fuel through said fuel pump and said cooler if the fuel temperature is above a second threshold temperature.

5. A method for operating a constant volume fuel pump comprising:
    recycling fuel through said constant volume fuel pump and a fuel tank if the fuel temperature is below a first threshold temperature;
    recycling fuel through said constant volume fuel pump if the fuel temperature is above a first threshold temperature and below a second threshold temperature; and
    recycling fuel through said constant volume fuel pump and in series with a cooler if the fuel temperature is above a second threshold temperature.

6. A method for operating a fuel flow system, including a recycling path and a cooler, comprising;
    sensing the temperature of the fuel; and
    inserting said fuel tank in said recycling path when said temperature of the fuel is below a first threshold temperature;
    removing said fuel tank from said recycling path when said temperature of the fuel is above a first threshold temperature and below a second threshold temperature;
    inserting said cooler in said recycling path when said temperature of the fuel is above a second threshold temperature.

7. A fuel recycling system comprising:
    a fuel pump;
    a first circuit for recycling fuel to said fuel pump;
    a cooler;
    a second circuit for recycling fuel to said fuel pump through said cooler;
    a fuel tank;
    a third circuit for recycling fuel to said fuel pump through said fuel tank;
    a thermostat; and
    a valve in flow communication with said fuel pump and controlled by said thermostat to direct fuel flow through said third circuit when said fuel is at a temperature below a first threshold temperature, to direct fuel flow through said first circuit when said fuel is at a temperature above a first threshold temperature but below a second threshold temperature, and to direct fuel flow through said second circuit when said fuel is at a temperature above said second threshold temperature.

8. A fuel recycling system comprising:
    a fuel pump;
    a first thermostatic controller located near the fuel pump inlet;

a first circuit for recycling fuel to said fuel pump;

a cooler;

a second circuit for recycling fuel to said fuel pump through said cooler;

a fuel tank;

a third circuit for recycling fuel to said fuel pump through said fuel tank;

a second thermostatic controller located near the outlet of said fuel tank; and a valve in flow communication with said fuel pump and controlled by said thermostat to direct fuel flow through said third circuit when the mean temperature of the fuel as measured by both the first and second thermostatic controllers is below a first threshold temperature, to direct fuel flow through said first circuit when the mean temperature of the fuel as measured by both the first and second thermostatic controllers is at a temperature above a first threshold temperature but below a second threshold temperature, and to direct fuel flow through said second circuit when the mean temperature of the fuel as measured by both the first and second thermostatic controllers is at a temperature above said second threshold temperature.

9. The system of claim 8 wherein if said second thermostatic controller measures a fuel temperature below said first threshold temperature, said second thermostatic controller overrides said first thermostatic controller and controls said valve to direct fuel flow through said third circuit.

10. The system of claim 8 wherein if said first thermostatic controller measures a fuel temperature above said first threshold temperature, said first thermostatic controller overrides said second thermostatic controller and controls said valve to direct fuel flow through said first circuit.

11. The system of claim 8 wherein if said first thermostatic controller measures a fuel temperature above said second threshold temperature, said first thermostatic controller overrides said second thermostatic controller and controls said valve to direct fuel flow through said second circuit.

12. The system as in any one of claims 7, 8, 9, 10 or 11 or the method as in any one of claims 8, 9, or 10, wherein said first threshold temperature is selected from the range of temperatures from about 90° F. to about 97° F.

13. The system as in any one of claims 7, 8, 9, 10 or 11 or the method as in any one of claims 8, 9, or 10 wherein said first threshold temperature is about 95° F.

14. The system as in any one of claims 7, 8, 9, 10 or 11 or the method as in any one of claims 8, 9, or 10, wherein said second threshold temperature is selected from the range of temperatures from about 20° F. to about 50° F.

15. The system as in any one of claims 7, 8, 9, 10 or 11 or the method as in any one of claims 8, 9, or 10, wherein said second threshold temperature is about 40° F.

* * * * *